US008621212B2

(12) United States Patent
Lim et al.

(10) Patent No.: US 8,621,212 B2
(45) Date of Patent: Dec. 31, 2013

(54) SYSTEMS AND METHODS FOR CRYPTOGRAPHICALLY ENHANCED AUTOMATIC BLACKLIST MANAGEMENT AND ENFORCEMENT

(75) Inventors: Cheow Guan Lim, Singapore (SG); Stephan Schaecher, Munich (DE)

(73) Assignee: Infineon Technologies AG, Neubiberg (DE)

( * ) Notice: Subject to any disclaimer, the term of this patent is extended or adjusted under 35 U.S.C. 154(b) by 752 days.

(21) Appl. No.: 12/645,062

(22) Filed: Dec. 22, 2009

(65) Prior Publication Data
US 2011/0154043 A1 Jun. 23, 2011

(51) Int. Cl.
G06F 21/00 (2013.01)
(52) U.S. Cl.
USPC .............................. 713/168; 347/86
(58) Field of Classification Search
USPC .......... 726/2–5, 16–21, 34, 35; 713/150, 172, 713/182
See application file for complete search history.

(56) References Cited

U.S. PATENT DOCUMENTS

| 4,640,138 | A | 2/1987 | Morris |
|---|---|---|---|
| 6,105,027 | A | 8/2000 | Schneider |
| 6,285,985 | B1 | 9/2001 | Horstmann |
| 6,356,529 | B1 | 3/2002 | Zarom |
| 6,664,969 | B1 | 12/2003 | Emerson |
| 6,678,821 | B1 | 1/2004 | Waugh |
| 6,952,475 | B1 | 10/2005 | Horn |
| 6,968,453 | B2 | 11/2005 | Doyle |
| 7,047,408 | B1 | 5/2006 | Boyko |
| 7,194,629 | B2 | 3/2007 | Silverbrook |
| 7,243,232 | B2 | 7/2007 | Vanstone |
| 7,313,697 | B2 | 12/2007 | Meyer |
| 7,613,924 | B2 | 11/2009 | Shankar |
| 7,823,214 | B2 | 10/2010 | Rubinstein |
| 2002/0194476 | A1 | 12/2002 | Lewis |
| 2004/0243474 | A1 | 12/2004 | Vu |
| 2005/0018841 | A1 | 1/2005 | Girault |
| 2005/0052661 | A1* | 3/2005 | Lapstun et al. ................ 358/1.1 |

(Continued)

FOREIGN PATENT DOCUMENTS

| DE | 10161137 B4 | 10/2003 |
|---|---|---|
| DE | 10161138 B4 | 2/2008 |

(Continued)

OTHER PUBLICATIONS

Bock et al., *A Milestone Toward RFID Products Offering Asymmetric Authentication Based on Elliptic Curve Cryptography*, 14 pages, not dated.

(Continued)

*Primary Examiner* — Gilberto Barron, Jr.
*Assistant Examiner* — David Le
(74) *Attorney, Agent, or Firm* — Patterson Thuente Pedersen, P.A.

(57) ABSTRACT

Embodiments relate to systems and methods for the management and enforcement of blacklists of counterfeited, cloned or otherwise unauthenticated devices. In an embodiment, a system comprises an accessory comprising an authentication chip including data signed by a private verification key, the data including a unique identifier related to the accessory, and a device comprising a public verification key forming a verification key pair with the private verification key and an identifier list, the device configured to read the data from the authentication chip, compare the unique identifier with the identifier list, and reject the accessory if the unique identifier is found in the identifier list.

34 Claims, 8 Drawing Sheets

(56) References Cited

U.S. PATENT DOCUMENTS

| | | | |
|---|---|---|---|
| 2005/0105884 A1* | 5/2005 | Satoh et al. .................... | 386/69 |
| 2005/0160277 A1 | 7/2005 | Sciupac | |
| 2005/0216724 A1* | 9/2005 | Isozaki et al. ................. | 713/150 |
| 2005/0243116 A1* | 11/2005 | Ward et al. ..................... | 347/19 |
| 2005/0246763 A1* | 11/2005 | Corcoran et al. ................ | 726/3 |
| 2006/0031790 A1 | 2/2006 | Proudler | |
| 2006/0107060 A1 | 5/2006 | Lewis | |
| 2006/0146081 A1* | 7/2006 | Vandermeulen et al. ....... | 347/14 |
| 2006/0161571 A1* | 7/2006 | Neill et al. .................... | 707/101 |
| 2006/0161976 A1* | 7/2006 | Kahn et al. ..................... | 726/21 |
| 2006/0230276 A1 | 10/2006 | Nochta | |
| 2007/0050631 A1* | 3/2007 | Shimizu et al. ............... | 713/182 |
| 2008/0024268 A1 | 1/2008 | Wong | |
| 2008/0165955 A1 | 7/2008 | Ibrahim | |
| 2009/0013381 A1 | 1/2009 | Torvinen | |
| 2009/0013410 A1 | 1/2009 | Kaler | |
| 2009/0019282 A1 | 1/2009 | Arditti | |
| 2009/0024352 A1 | 1/2009 | Braun | |
| 2009/0070506 A1 | 3/2009 | Furtner | |
| 2009/0083834 A1 | 3/2009 | Rubinstein | |
| 2009/0235073 A1 | 9/2009 | Braun | |
| 2010/0011218 A1 | 1/2010 | Shankar | |
| 2010/0069086 A1 | 3/2010 | Ahlin | |
| 2010/0226495 A1 | 9/2010 | Kelly | |
| 2011/0093714 A1 | 4/2011 | Schaecher | |
| 2011/0154043 A1 | 6/2011 | Lim | |

FOREIGN PATENT DOCUMENTS

| | | |
|---|---|---|
| EP | 1773018 | 4/2007 |
| WO | WO2007107450 | 9/2007 |
| WO | WO2007112791 | 10/2007 |
| WO | WO2008040655 | 4/2008 |

OTHER PUBLICATIONS

Technology Media, *Technology Innovation: Infineon Helps Protect Consumers from Counterfeit Batteries and other Electronic Accessories with World First Authentication Chip Featuring Elliptic Curve Algorithms and Integrated Temperature Sensor*, 2 pages, Sep. 17, 2008.

Hammerschmidt, Christoph, EE Times, *Peripherals authentication could change landscape*, Sep. 28, 2009, 2 pages.

Thomson Reuters, *Infineon Demonstrates Remote PC Peripherals Authentication Capability With ORIGA™ Authentication Chip Using Intel*, 2 pages, Sep. 22, 2009.

Infineon Origa, *Original Product Authentication Solution SLE95050F1*, Published by Infineon Technologies North America, © 2009, 3 pages.

Origa™ SLE95050 *Original Product Authentication and Brand Protection Solution*, Short Product Information, www.infineon.com/ORIGA, Version 1.50, 19 pages, Jun. 2009.

Origa™—*Original Product Authentication & Brand Protection Solution-SLE 95050*, 2 pages, © 1999-2009.

Anderson, Ross, *Cryptography and Competition Policy—Issue with 'Trusted Computing'*, 21 pages, presented at $2^{nd}$ Annual Workshop on Economics & Information Security on May 29, 2003.

IBM, IBM eServer Cryptographic Coprocessor Security Module, Aug. 29, 2007, pp. 1-32.

Krhovjak, Jan, EMV: Integrated Circuit Card Specifications for Payment Systems; Feb. 20, 2006; Faculty of Informatics, Masaryk University; pp. 1-13.

Better Protection from Client to Data Center Made Possible with New Trusted Computing Group Storage Device Specifications, Jan. 27, 2009, www.wikipedia.com.

Texas Instruments, Battery Authentication and Security Schemes:, Jul. 2005, SLUA346 (Application Report), pp. 1-7, retrieved date; Jan. 10, 2012.

Texas Instruments, Battery Pack Security and Authentication IC for Protable Application s (bqSecure TM)(bq26150) SLUS641B—Jan. 2005—Revised Nov. 2009; Retrieved date: Jan. 10, 2012.

Duncan Standing, "Biometric ID ePassports: Everything's Changed and Nothing's Changed", 2007, www.SecurityWorldMag.com; pp. 1-6; Retrieved Date: Jan. 10, 2012.

RSA Laboratories, 3.6.1 *What is Diffie-Hellman?*, available at www.rsa.com/rsalabs/node.asp?id=2248 as of Feb. 16, 2011, © 2010, 2 pages.

Application and File History of U.S. Appl. No. 13/185,825, filed Jul. 19, 2011, Inventors: Lim et al.

Application and File History of U.S. Appl. No. 12/582,362, Inventors Schaecher et al., filed Oct. 20, 2009.

* cited by examiner

SYSTEMS AND METHODS FOR CRYPTOGRAPHICALLY ENHANCED AUTOMATIC BLACKLIST MANAGEMENT AND ENFORCEMENT

TECHNICAL FIELD

The invention relates generally to accessory authentication in personal electronic devices and more specifically to the automatic management and enforcement of blacklists of counterfeited, cloned or otherwise unauthenticated devices.

BACKGROUND

The use of encryption for authentication of devices is generally known. Conventionally, a message, or "challenge," is sent from a system or device to an object to be authenticated, and a message-dependent response is sent by the object to the system in reply. The system then evaluates the response to determine whether the response was sufficient to authenticate the object.

Such a method may be used, for example, to verify components of a system or device, including components that are removable, replaceable or available after-market. For example, an ink cartridge for an ink jet printer can be authenticated to determine whether it is an authorized and compatible cartridge for the particular printer. If the cartridge is successfully authenticated, normal printer operation utilizing that cartridge ensues. In an attempted use of a cartridge that is not successfully authenticated, no operation or only limited operation could be authorized as a result of the failed authentication procedure.

Counterfeiters, however, can attempt to circumvent authentication procedures through brute force cloning of the authentication chip, producing great numbers of devices with seemingly authentic though identical authentication chips. In online and networked applications, blacklisting is often used to detect these clones, with a database of blacklisted devices available for checking. Many devices for which authentication and/or counterfeit and cloning prevention is desired, however, are not networked, providing no opportunity for automatic comparison against such a database. Therefore, prevention of this and other types of counterfeiting and the use of blacklisting, for example in low-cost, high volume non-networked devices, is desired.

SUMMARY OF THE INVENTION

Embodiments relate to systems and methods for the management and enforcement of blacklists of counterfeited, cloned or otherwise unauthenticated devices. In an embodiment, a system comprises an accessory comprising an authentication chip including data signed by a private verification key, the data including a unique identifier related to the accessory, and a device comprising a public verification key forming a verification key pair with the private verification key and an identifier list, the device configured to read the data from the authentication chip, compare the unique identifier with the identifier list, and reject the accessory if the unique identifier is found in the identifier list.

In another embodiment, a method comprises reading signed data from a first device by a second device, extracting a unique identifier from the data, comparing the unique identifier with a unique identifier blacklist stored in the second device, rejecting the first device for use with the second device if the unique identifier is found in the unique identifier blacklist, and accepting the first device for use with the second device and adding the unique identifier to the unique identifier blacklist if the unique identifier is not found in the unique identifier blacklist.

In another embodiment, a semiconductor chip adapted to be embedded in a first device comprises a memory comprising data signed by a private verification key, wherein the data includes a unique identifier related to the semiconductor chip and a global blacklist of unique identifiers, and wherein the private authentication key is stored in a secure portion of the memory, and a communication interface configured to communicate with a second device comprising a public verification key using an asymmetric cryptographic technique, wherein the communication interface is configured to communicate the signed data to the second device.

In another embodiment, a microcontroller comprises circuitry configured to store a private authentication key, a public authentication key and data signed by a private verification key, the data including a unique identifier and a global blacklist, and communication circuitry configured to communicate public authentication key and the data, to receive a challenge encrypted with the public authentication key, and to communicate a response related to the encrypted challenge unencrypted with the private authentication key.

BRIEF DESCRIPTION OF THE DRAWINGS

The invention may be more completely understood in consideration of the following detailed description of various embodiments of the invention in connection with the accompanying drawings, in which.

Figure 1:
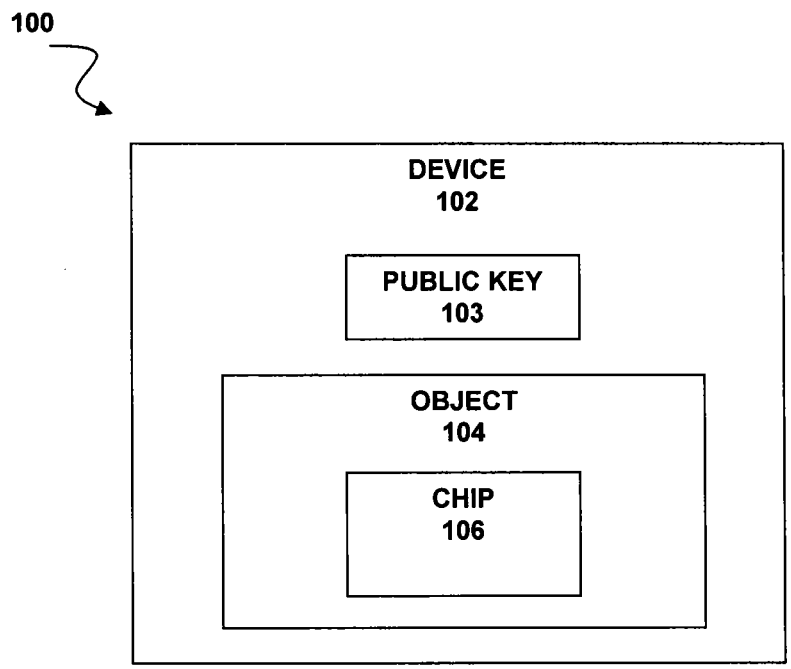
FIG. 1 is a block diagram of a device according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments of the invention utilize systems and methods for asymmetric cryptographic accessory authentication, such as those described in commonly owned U.S. patent application Ser. No. 12/582,362, entitled "SYSTEMS AND METHODS FOR ASYMMETRIC CRYPTOGRAPHIC ACCESSORY AUTHENTICATION" and filed Oct. 19, 2009, which is hereby incorporated by reference in its entirety. As discussed in the aforementioned patent application, secure authentication of accessories, batteries, parts and other objects can be provided at a lower cost suitable for price-sensitive applications using signed certificates and unique public and private key pairs.

For example, FIG. 1 depicts an embodiment of an authentication system 100. Authentication system 100 includes a device 102, such as a mobile phone; personal digital assistant (PDA); camera; MP3 player, gaming system, audio and/or video system, or other entertainment device; computer, computer system, network or computing device; printer, scanner or other digital imaging device; medical device or equipment or diagnostic supply; automobile or automotive system; industrial system; or some other electronic or computer device. Device 102 includes a public verification key 103, which will be described in more detail below, and an object 104 with which device 102 operates in cooperation. In embodiments, object 104 can comprise a battery; an accessory, including earphones, a headset, speakers, a docking station, a game controller, a charger, a microphone and others; a printer ink cartridge; a computer or computer system component, network device, peripheral, USB or other storage device; automotive part, component or accessory; industrial component or part; or some other part or component, and for which authentication is required or desired. In embodiments, object 104 is a replacement component, such as an aftermarket accessory or battery, though object 104 can also be an original part. Object 104 can be provided by the same manufacturer or provider as device 102 or by some other party, such as an authorized manufacturer and/or distributor of replacement and aftermarket parts and accessories.

Object 104 is depicted in FIG. 1 as operating within or as part of device 102, such as in an embodiment in which device 102 comprises a printer and object 104 comprises an ink cartridge. In other embodiments, object 104 is external to device 102, such as when device 102 is a mobile phone and object 104 is a wireless earpiece. These embodiments are examples only, and many other device/object combinations and pairings can be used in other embodiments.

Figure 2:
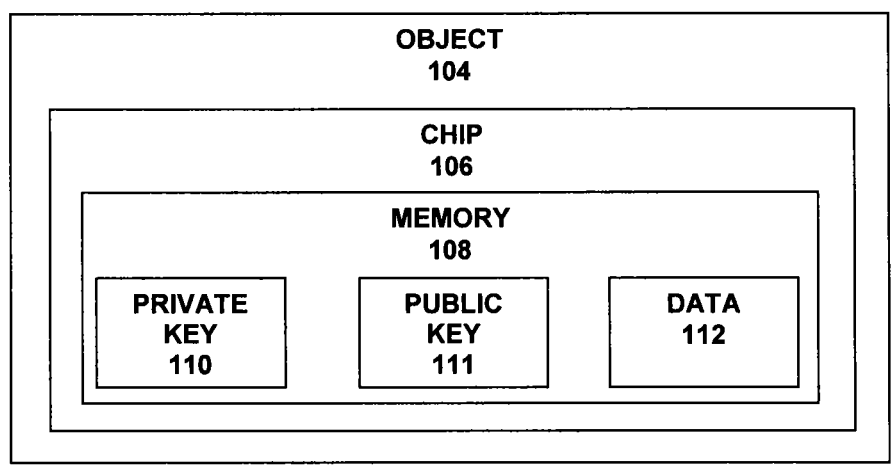
FIG. 2 is a block diagram of an object including an authentication chip according to an embodiment.

Referring also to FIG. 2, object 104 comprises an authentication chip 106 in an embodiment. Authentication chip 106 comprises a semiconductor chip in an embodiment and includes memory 108. Memory 108 is non-volatile memory in an embodiment, configured to store data objects, for example a private authentication key 110 and a public authentication key 111 stored in a secure portion of memory 108. Public authentication key 110 and private authentication key 111 form an authentication key pair. Memory 108 can also store one or more of a unique ID and/or serial number of object 104, application-specific data and other information, together represented in FIG. 2 by data 112. Additional data objects which can be stored in memory 108 include a unique portion of an authentication certificate, described in more detail below.

In an embodiment, the functionality and features of authentication chip 106 are realized as one or more system on chip components of object 104 to achieve cost or size savings. For example, object 104 can comprise a BLUETOOTH headset, which often is of small size and therefore may not be able to accommodate an additional chip 106. Instead, the features and functionality are integrated on an existing chip in the headset, saving space and possibly also costs. In such an embodiment, a manufacturer of the headset or other device comprising object 104 can be provided with, for example, a VHDL netlist for integration into an existing controller or processor of the headset or other device in place of a discrete authentication chip 106, which little or no change in the features, functions and security thereby provided.

Figure 3:
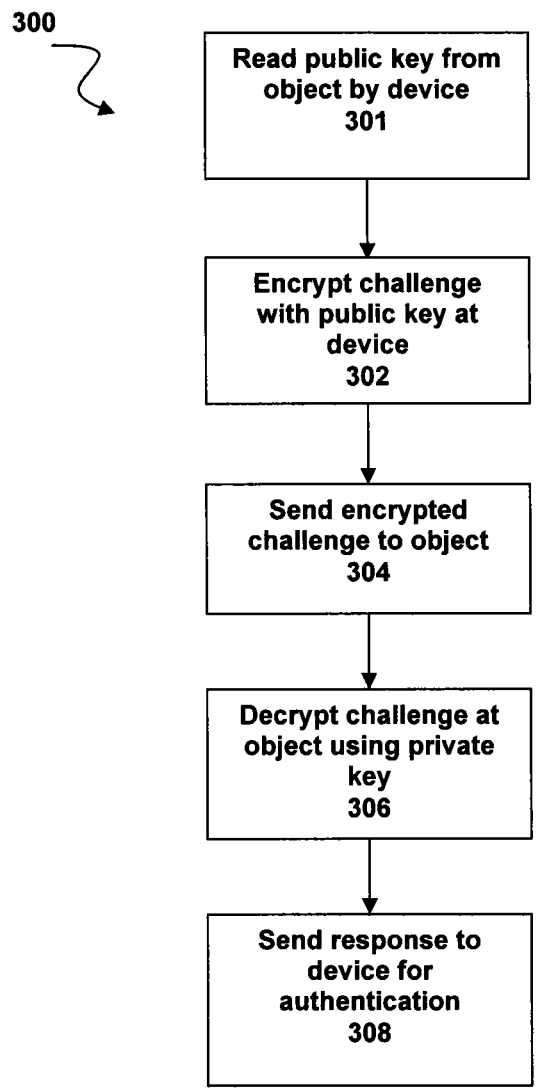
FIG. 3 is a flowchart of an authentication process according to an embodiment.

Referring to FIG. 3, a method 300 can be implemented between device 102 and object 104 to determine whether object 104 is authenticated for use with or by device 102. At 301, device 102 reads public authentication key 111 from object 104. Device 102 now has two public keys: public verification key 103 and public authentication key 111.

Before using public authentication key 111, however, device 102 determines whether public authentication key 111 is verified or genuine. In a conventional system using global or constant public and private key pairs for devices, verification can be accomplished by simply comparing the global key (public authentication key 111 received from object 104) with the same global key or a hash thereof stored on device 102. Use of global keys, however, does not provide the highest levels of security, as the global keys are vulnerable to hacking or other corruption. In some embodiments, therefore, unique public and private keys are used for each device, while in other embodiments public keys may be reused. For example, the first one million objects 104 can be manufactured with unique public keys, after which the public keys are repeated. In these embodiments, an additional unique identifier is used. Various embodiments are described in more detail below.

At 302, and after verifying public authentication key 111, device 102 uses public authentication key 111 to encrypt a challenge. In an embodiment, the challenge comprises a random number. In another embodiment, the challenge also includes additional data. In embodiments, the encryption is carried out according to an asymmetric encryption methodology, for example an elliptic curve cryptographic algorithm. In another embodiment, an RSA cryptographic algorithm or some other cryptographic algorithm is used.

At 304, the encrypted challenge is transmitted from device 102 to object 104. In embodiments, the challenge can be transmitted wirelessly, such as by radio frequency (RF), or by wire, such as by a power line or other wire connection between device 102 and object 104. At 306, object 104 decrypts the received encrypted challenge using private authentication key 110. At 308, object 104 sends the decrypted challenge as a response to device 102, and device 102 determines whether the response is appropriate such that object 104 can be authenticated.

After method 300, device 102 can retain both public keys 103 and 111, or device 102 can delete public key 111 that was read from object 104. Retaining both keys can save time and calculations in the future, while deleting one key can free memory space.

Figure 4:
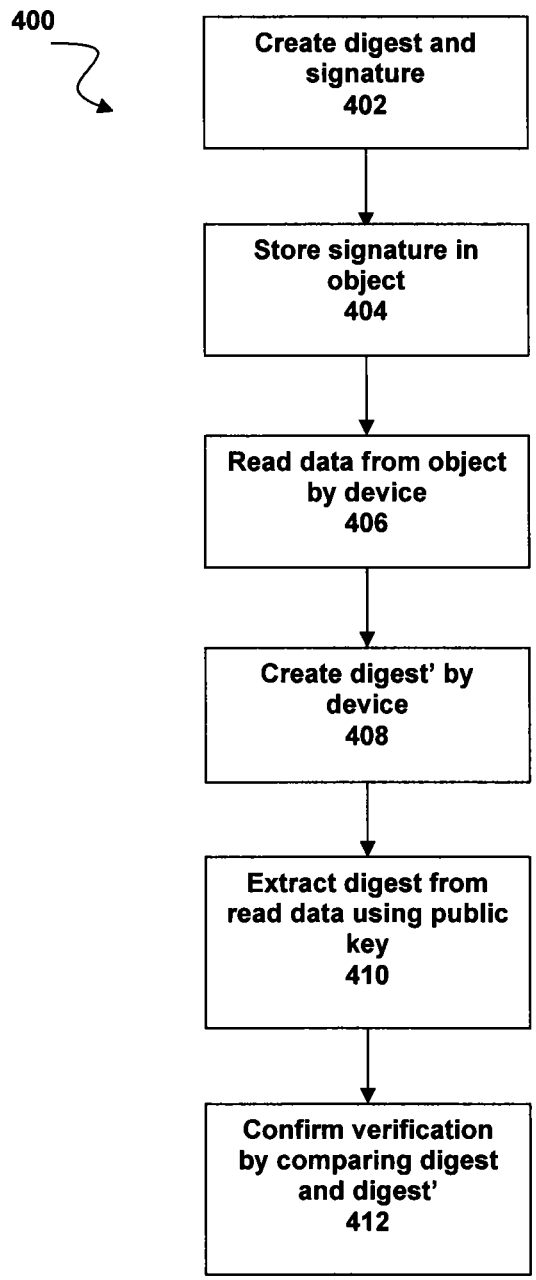
FIG. 4 is a flowchart of a verification process according to an embodiment.

In an embodiment, and referring to FIG. 4, a certificate process 400 is used with process 300 to enable use of unique public and private key pairs with devices and objects. At 402, a digest is created by a certificate authority. The certificate authority can be a manufacturer, fabricator, distributor or other entity related to chip 106 and/or object 104. A private verification key 510 (shown in FIG. 5) is held by the certificate authority and forms a verification key pair with public key 103 stored on device 102.

Figure 5:
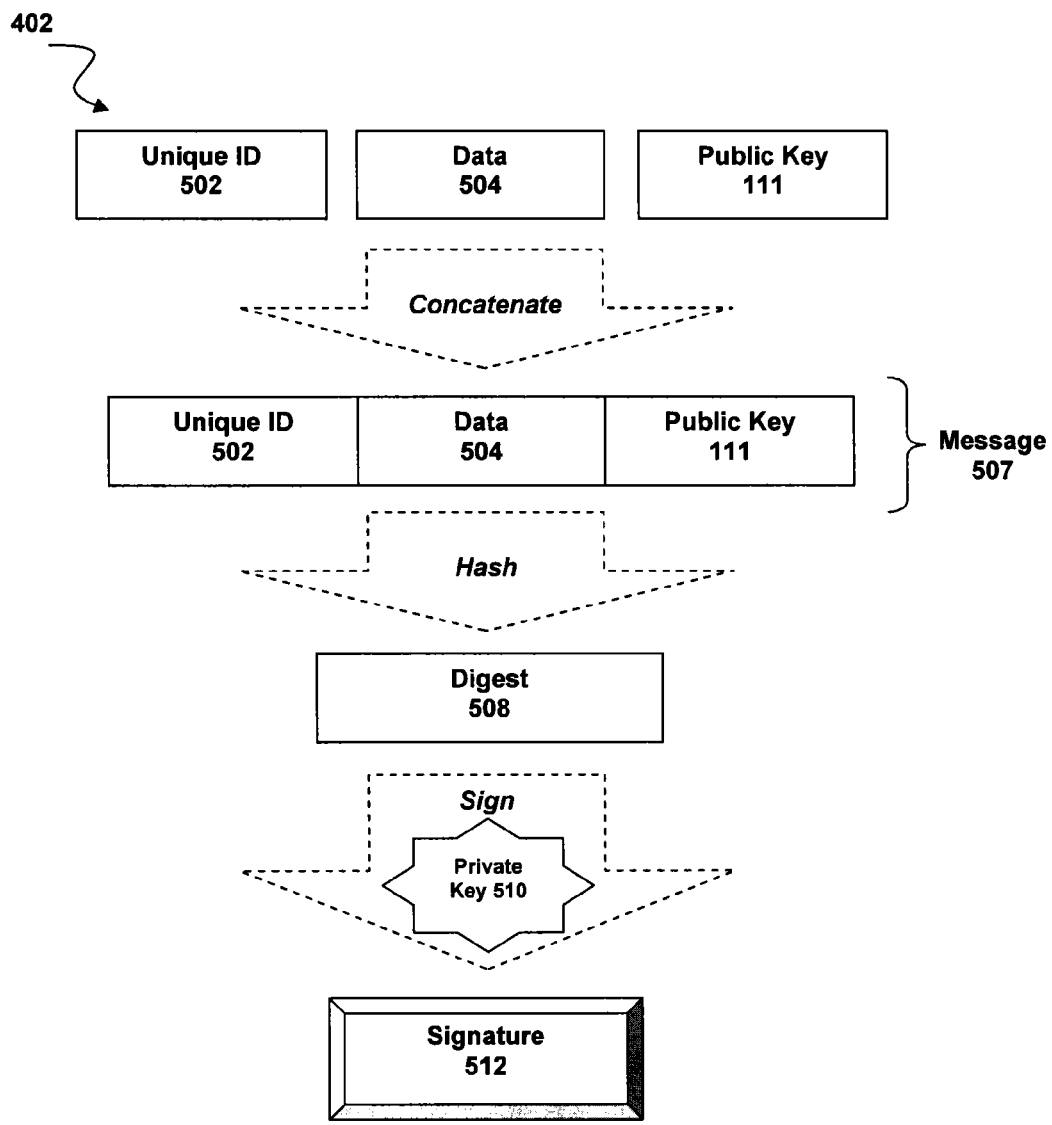
FIG. 5 is a block diagram of a signature generation process according to an embodiment.

Creation of the digest by the certificate authority is shown in more detail in FIG. 5. First, a message 507 is created by concatenating a unique device identifier 502 related to object 104 and/or chip 106, such as a serial or ID number or code; public authentication key 111; and data 112. Message 507 is hashed to create a digest 508. In an embodiment, an SHA-1 cryptographic hash algorithm is used, while other hash algorithms and techniques are used in other embodiments, for example SHA-256.

Digest 508 is signed using private verification key 510 of the certificate holder to create a signature 512. In an embodiment, an elliptic curve cryptographic algorithm is used to sign digest 508. Advantages of an elliptic curve cryptographic algorithm include shorter keys and fewer calculations because of the shorter keys, which can be beneficial in small, low-cost and/or embedded objects having less processing capacity. In another embodiment, an RSA cryptographic algorithm or some other cryptographic algorithm is used.

Figure 6:
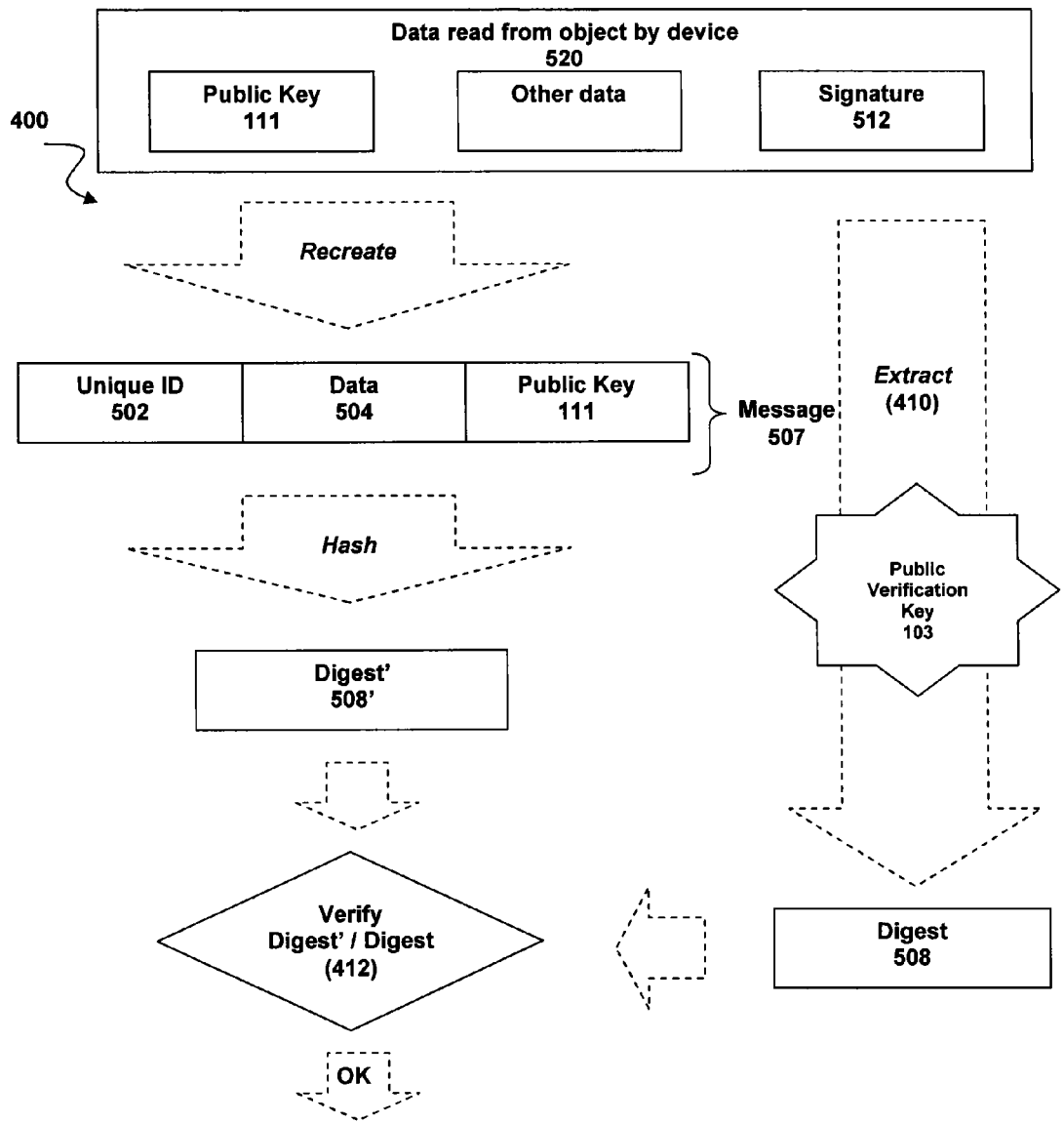
FIG. 6 is a block diagram of a verification process according to the embodiment of FIG. 5.

Referring to FIGS. 4-6, signature 512 is stored in memory 108 of object 104 at 404. In an embodiment, this is carried out by the certificate authority. In another embodiment, this is done by a manufacturer or other entity related to object 104. The certificate authority and the manufacturer can be the same or different entities, but in general access to and handling of the signature is carefully controlled to improve security.

When object 104 is first attempted to be used with a device 102, device 102 must authenticate object 104 and verify that any data, information, content, media or other quantity originating from object 104, or object 104 itself, are legitimate. Accordingly, device 102 reads signature 512 and other data 520 from object 104 at 406. As part of this read, device 102 receives public authentication key 111 from object 104 as previously described, but device 104 cannot know whether public key 111 is corrupted or has been compromised and thus must verify the key.

This can be done using signature 512. Device 102 first recreates message 507 from data 520 and hashes message 507 according to the same algorithm used to create digest 508, thereby creating digest' (508') at 408. At 410, device 102 then extracts the original digest 508 from signature 512 read from object 104 using public verification key 103, which is intended, absent tampering or corruption, to correspond to private verification key 510 used to originally create signature 512. If the extraction is successful, device 102 compares digest' (508') with digest 508 at 412. If digest 508 and digest' (508') match, device 102 has verified that the data and information received from object 104 is uncorrupted and can use public authentication key 111 received from object 104 to authenticate object 104 according to process 300.

As previously mentioned, one possible way to circumvent authentication procedures, such as authentication system 100, is to clone an authentic authentication chip 106 and use the clones in counterfeit objects. A challenge to counterfeiters implementing brute force cloning of authentication chip 106 is that it is difficult to create new key pairs and signature certifications using cryptographic processes for each object 104. This is due in part to the level of computing capability needed to generate the signed certificates, which counterfeiters will not want to afford for high volume but relatively low-cost objects like printer ink cartridges and other devices and accessories. While the signature could instead be obtained by theft, such as spying, counterfeiters generally are not able to or cannot reliably depend on obtaining signed certificates in such a manner. Therefore, counterfeit objects that include cloned authentication chips, while appearing to be authentic when examined or used individually, all usually have identical certificates because they are simply copied as part of the cloning.

Figure 7:
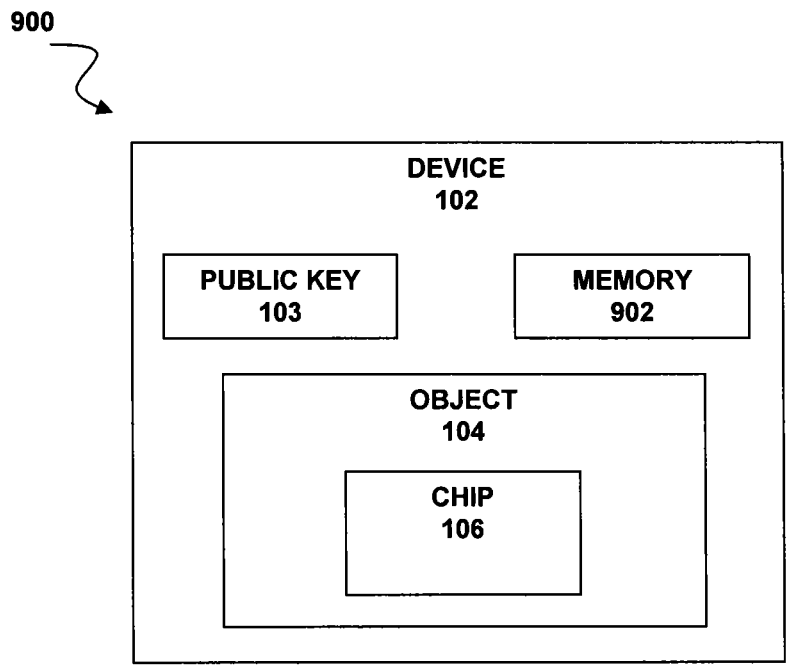
FIG. 7 is a block diagram of a device according to an embodiment.
Figure 8:
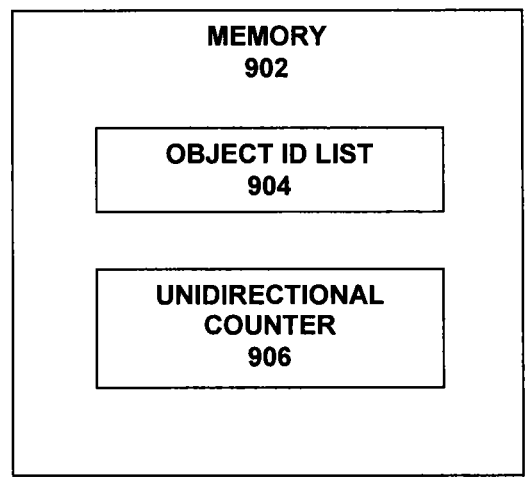
FIG. 8 is a block diagram of a device memory according to an embodiment.

Embodiments relate to detecting, preventing use of and blacklisting these and other counterfeit devices. FIG. 7 depicts another embodiment of an authentication system 900, similar to system 100. In system 900, device 102 comprises a memory 902. Referring also to FIG. 8, memory 902 includes an object identification (ID) list 904 and a unidirectional counter 906.

In an embodiment, when use of object 104 with device 102 is first attempted and device 102 reads data from object 104 (refer, for example, to FIGS. 6 and 8 and data 520), data 520 includes unique ID 502 related to object 104. In other embodiments, such as in those in which public keys are repeated as mentioned herein above, data 520 includes some other unique identifier. Whether unique ID 502 or a unique identifier is used, both would be part of the data within the signed certificate as described above and therefore protected from manipulation. While either the unique ID 502 of chip 106 or another unique identifier can be used in various embodiments depending on the circumstances, the term unique identifier will be used going forward for simplicity.

If a counterfeiter clones many objects, each object will have the same unique identifier. Therefore, in an embodiment, device 102 retains each unique identifier in object ID list 904 stored in memory 902. Then, when a new object 104 is attempted to be used with device 102, device 102 first checks whether the unique identifier of that object 104 is already included in object ID list 904. If not, object 104 can be authenticated. If the unique identifier is found in list 904, the object 104 will not be authenticated.

Figure 9:
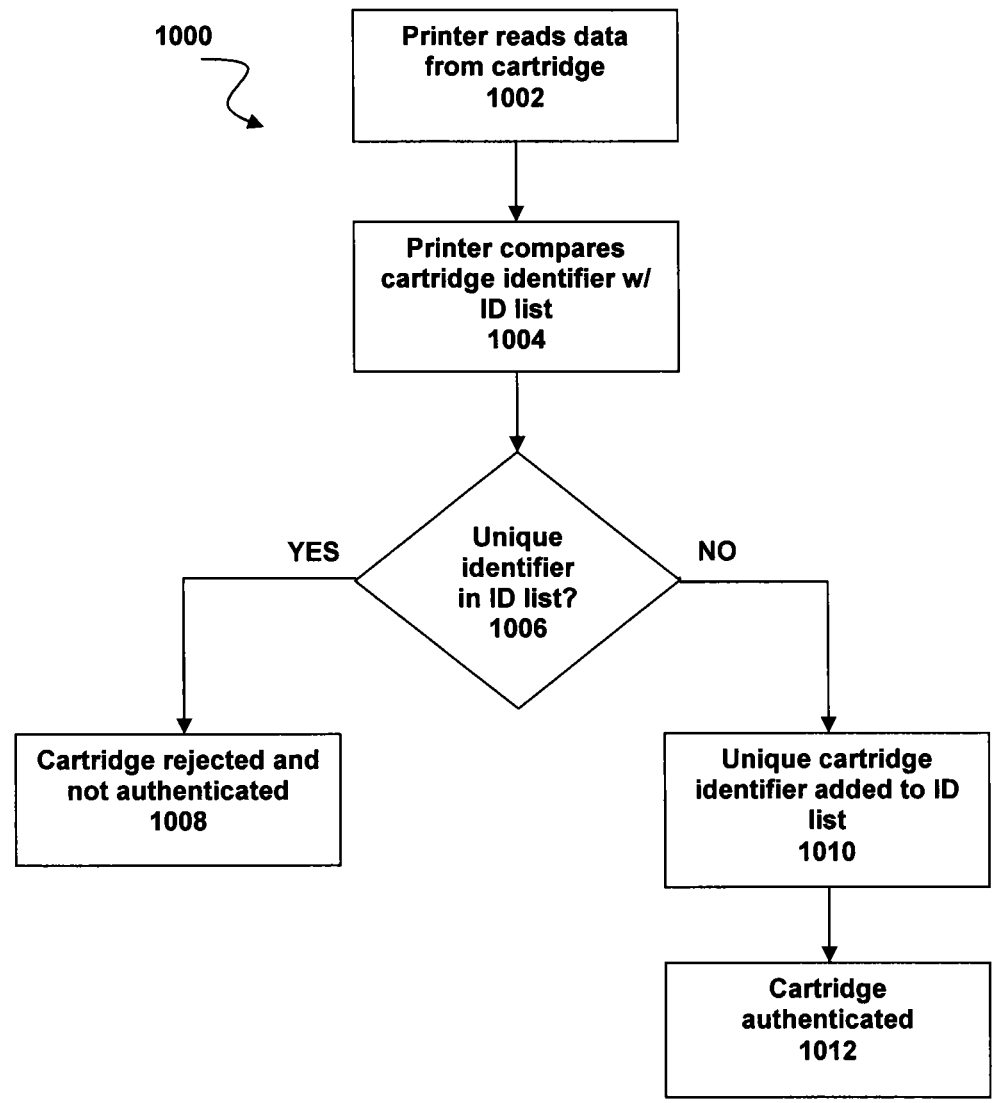
FIG. 9 is a flowchart of a blacklist method according to an embodiment.

Referring to FIG. 9, a non-limiting example method 1000 related to a printer as device 102 and an ink cartridge as object 104 will be described. At 1002, and as previously described herein with reference to FIGS. 3-8, the printer reads data from the cartridge. In an embodiment, the data is part of the signed certificate and includes a unique cartridge identifier. At 1004, the printer compares the unique cartridge identifier extracted from the data with an ID list locally stored in a memory of the printer and, at 1006, determines whether the unique cartridge identifier is in the ID list. If the unique cartridge identifier is in the list, the cartridge is rejected by the printer at 1008. Rejection can include many forms, for example printer inoperability until a new, authentic cartridge is inserted.

If the unique cartridge identifier is not found in the ID list, the unique cartridge identifier is added to the ID list at 1010, creating a self-learned local blacklist, and the cartridge is authenticated for use at 1012. In an embodiment, the printer retains a plurality or all of the most recent unique identifiers in the list, such that each subsequent cartridge can be compared against a more extensive list. The number of unique identifiers retained by the printer is limited only the memory available. Thus, in one embodiment the printer retains all unique identifiers of any cartridge attempted for use. In other embodiments, the printer memory may be limited such that the printer only retains a number of the most recent unique identifiers, for example the fifty most recent unique identifiers.

Returning to rejection of the cartridge at 1008, the rejected unique identifiers can also be communicated back to a manufacturer or distributor for addition to a global blacklist. Additionally or alternatively, a manufacturer can use market intelligence and other information to build or add to a global blacklist of rejected identifiers. In an embodiment, and referring also to FIG. 7, the most up-to-date version of the global blacklist can be included in data on authentication chip 106 such that an encrypted version of the global blacklist is provided to the printer each time a new authentic cartridge is first attempted to be used with that printer. Providing the global blacklist as part of the encrypted data provides an additional level of security by preventing tampering with the blacklist. One drawback, however, is time; because the global blacklist is provided on the authentication chip earlier in the manufacturing process, there is a gap in time between when the global list is included on chip 106 and when the final object 104 incorporating chip 106 is sent to market during which additional counterfeit unique identifiers may be discovered. In other embodiments, the global blacklist can instead or also be directly stored in memory 902 of newly manufactured printers such that each printer will catch and reject the first instance of attempted use of a cartridge having that unique identifier. The manufacturer of the printers could also sign the certificate in an embodiment. Providing the global blacklist also has the benefit of enabling the printer to identify an increased number of counterfeit cartridges the first time they are attempted for use with that printer, rather than accepting a counterfeit cartridge because that cartridge's unique identifier is not in the local blacklist (object ID list 904). These and other embodiments can reduce the time between provision of the global blacklist and market release of the product, thereby providing the most up-to-date information available.

Embodiments also include a unidirectional counter 906 (referring again to FIG. 8) to prevent unjust rejection of authentic objects. Returning to the printer and ink cartridge example, a user may need to remove and reinstall an authentic ink cartridge for some reason, such as to remove dust or dirt from the cartridge or printing mechanism. In this situation and according to method 1000, the printer would reject the cartridge upon reinstallation because the unique cartridge identifier would be found in the ID list and the printer would not know that the (authentic) cartridge had simply been removed and reinstalled. Using unidirectional counter 906, however, reduces or eliminates these false rejections.

Figure 10:
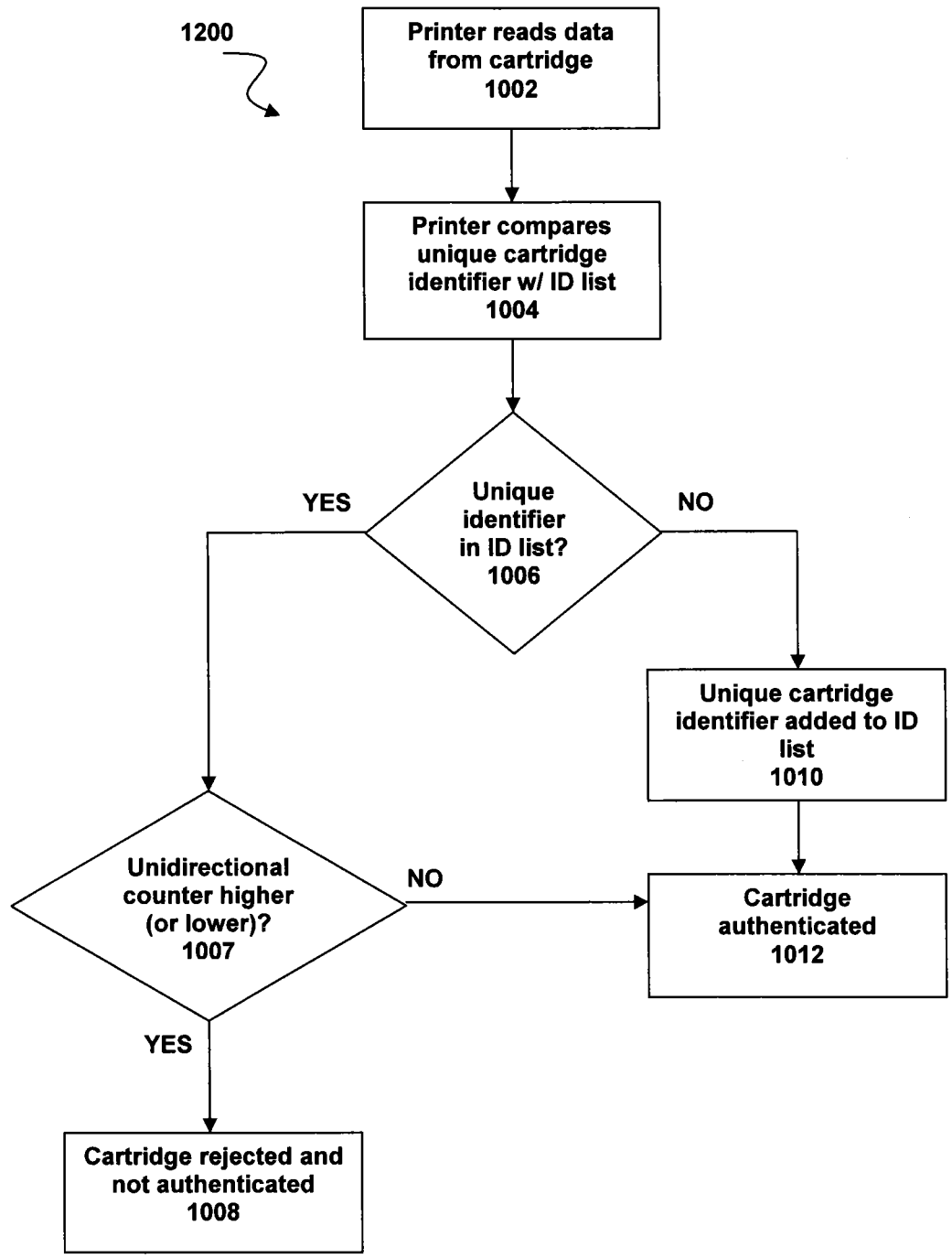
FIG. 10 is a flowchart of a blacklist and counter verification method according to an embodiment.

Method 1200 of FIG. 10 includes such a unidirectional counter 906. If the unique cartridge identifier is not found in the ID list at 1006, the printer then checks the unidirectional counter at 1007. The unidirectional counter can take many forms so long as the counter counts only in a single direction (i.e., up or down but not both). In the printer and ink cartridge example, the unidirectional counter can be an ink level indicator, which will count down. The ink level is stored in unidirectional counter 906 of memory 902 of the printer, and if the ink level of the cartridge at 1007 is higher than the level stored in unidirectional counter 906, the cartridge is rejected at 1008. If the ink level at 1007 is the same as or lower than the level stored in unidirectional counter 906, the cartridge is deemed authenticated at 1012. In other embodiments, such as one in which device 102 is an electronic device and object 104 is a battery, unidirectional counter 906 can be related to a charge level or lifetime recharge cycle of the battery. In an embodiment in which device 102 is a medical device and object 104 is a consumable accessory with a limited number of uses, unidirectional counter 906 can be a consumed number of uses, counting up. In these and other example embodiments, whether the unidirectional counter being higher or lower at 1007 is an indication of counterfeiting or authenticity, respectively, can be reversed. In some embodiments, the unidirectional counter is an object 104-side counter, with only a reading or indicator of the counter stored in unidirectional counter 906 of memory 906. In other embodiments, unidirectional counter 906 is a device 102-side counter.

In embodiments of method 1200 in which a blacklist is provided by object 104 to device 102 as part of the signed certificate and an object 104 with a blacklisted ID is later attempted to be used with device 102, device 102 will reject that object 104 regardless of the unidirectional counter comparison. In further embodiments, unidirectional counter 906 also prevents use of piggybacked counterfeit objects, such as when a counterfeit object is coupled to an authentic object so as to use the authentic object to obtain authentication with the device. With unidirectional counter 906 being a unidirectional increment or decrement set-value counter, the object will be considered exhausted when that set value is reached, regardless of the presence of the piggybacked device.

Embodiments provide secure authentication of accessories, batteries, parts and other objects at a lower cost suitable for price-sensitive applications. Additionally, embodiments provide recovery action options in the event of hacking or key misuse by key blacklisting. Thus, if hacking of a public key is discovered, that key can be revoked or "blacklisted" and disabled globally, rather than having to block each single key in conventional approaches. This provides enhanced security and more efficient key management. Logistical improvements and efficiencies are also realized in that the device need not be preconfigured with the correct public key for a particular object, as the public key is extracted from the certificate stored in the object upon first use according to an embodiment. The overall security level is thereby enhanced, providing cost-effective authentication. Further, the use of local and global blacklisting and direction counters provides additional security against cloned and other counterfeit accessories.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, implantation locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system comprising:
    an accessory comprising an authentication chip including data signed by a private verification key, the data including a unique identifier related to the accessory; and
    a device comprising a public verification key forming a verification key pair with the private verification key and a global identifier list maintained at least partially external to the device, the device configured to read the data from the authentication chip, compare the unique identifier with the global identifier list, and reject the accessory if the unique identifier is found in the global identifier list.

2. The system of claim 1, wherein the device is configured to add the unique identifier to the global identifier list stored in the device and authenticate the accessory if the unique identifier is not found in the global identifier list.

3. The system of claim 1, wherein the authentication chip is a semiconductor chip.

4. The system of claim 1, wherein the device comprises memory, and wherein the global identifier list is stored in the memory.

5. The system of claim 4, wherein the device further comprises a unidirectional counter stored in the memory, and wherein the device is configured to compare the unidirectional counter with the accessory if the unique identifier is found in the global identifier.

6. The system of claim 5, wherein the device is configured to reject the accessory only if the unique identifier is found in the global identifier list and the comparison of the unidirectional counter with the accessory indicates inauthenticity.

7. The system of claim 1, wherein the data includes a global blacklist of unique identifiers, and wherein the global identifier list is updated with the global blacklist.

8. The system of claim 1, wherein the global identifier list is added during manufacturing of the device.

9. The system of claim 1, wherein the authentication chip further comprises a private authentication key and a public authentication key, and wherein the device is configured to read the public authentication key from the authentication chip, verify the data and the public authentication key using the public verification key, and authenticate the accessory for use with the device using the public authentication key if verified.

10. The system of claim 1, wherein the device and the accessory are at pair selected from the group consisting of: a mobile phone and a battery; a mobile phone and a mobile phone accessory; a printer and printer cartridge; a gaming unit and a gaming unit controller; an electronic device and a battery; an electronic device and an accessory; a computer device and an accessory; a computer device and a battery; at computer device and a peripheral device; a network and networking device; a universal serial bus (USB) host device operably connected to a USB device through a USB hub; a media device and a battery; a media device and an accessory; a medical device and a battery; a medical device and an accessory; a personal digital assistant (PDA) and a battery; a PDA and an accessory; an industrial system and an industrial system component; an automobile and an automotive accessory; and an automotive system and an automotive part.

11. The system of claim 1, wherein the identifier list retains a plurality of unique identifiers each associated with one of a plurality of accessories attempted for use with the device.

12. A semiconductor chip adapted to be embedded in a first device, comprising:
a memory comprising data signed by a private verification key, wherein the data includes a unique identifier related to the semiconductor chip and a global blacklist of unique identifiers maintained at least partially external to the semiconductor chip, and wherein the private authentication key is stored in a secure portion of the memory; and
a communication interface configured to communicate with a second device comprising a public verification key using an asymmetric cryptographic technique, wherein the communication interface is configured to communicate the signed data to the second device.

13. A microcontroller comprising:
circuitry configured to store as private authentication key, a public authentication key and data signed by a private verification key, the data including a unique identifier and as global blacklist maintained at least partially external to the microcontroller; and
communication circuitry configured to communicate public authentication key and the data, to receive a challenge encrypted with the public authentication key, and to communicate a response related to the encrypted challenge unencrypted with the private authentication key.

14. A method comprising:
reading signed data from a first device by a second device;
extracting a unique identifier from the data;
comparing the unique identifier with a global unique identifier blacklist stored in the second device and maintained at least partially external to the second device;
rejecting the first device for use with the second device if the unique identifier is found in the global unique identifier blacklist; and
accepting the first device for use with the second device and adding the unique identifier to the global unique identifier blacklist stored in the second device if the unique identifier is not found in the global unique identifier blacklist.

15. The method of claim 14, further comprising configuring the first device with an authentication chip, wherein the signed data is stored in a memory of the authentication chip.

16. The method of claim 14, further comprising using a public verification key stored in the second device to verify the signed data, wherein the signed data is signed by a private verification key forming a key pair with the public verification key.

17. The method of claim 14, further comprising comparing a unidirectional counter in the second device with the first device and:
if the comparison is favorable, accepting the accessory for use with the device; and
if the comparison is unfavorable, rejecting the accessory for use with the device.

18. The method of claim 17, further comprising storing the unidirectional counter in a memory of the second device.

19. The method of claim 14, further comprising:
extracting a global blacklist from the signed data; and
updating the global unique identifier blacklist stored in the second device with the global blacklist.

20. The method of claim 19, further comprising storing the global unique identifier blacklist in a memory of the second device.

21. The method of claim 14, further comprising storing a plurality of unique identifiers associated with a plurality of first devices, respectively, in the global unique identifier blacklist.

22. The method of claim 14, further comprising updating the global unique identifier blacklist.

23. The method of claim 14, further comprising storing the global unique identifier blacklist in a memory of the second device during production of the second device.

24. The system of claim 1, wherein the global identifier list comprises a database of blacklisted unique identifiers.

25. The system of claim 24, wherein the blacklisted unique identifiers are related to accessories from at least one of a manufacturer or a distributor.

26. The semiconductor chip of claim 12, wherein the global blacklist comprises a database of blacklisted unique identifiers.

27. The semiconductor chip of claim 26, wherein the blacklisted unique identifiers are related to accessories from at least one of a manufacturer or a distributor.

28. The system of claim 13, wherein the global blacklist comprises a database of blacklisted unique identifiers.

29. The system of claim 28, wherein the blacklisted unique identifiers are related to at least one of a manufacturer or a distributor.

30. The method of claim 14, wherein the global unique identifier blacklist comprises blacklisted unique identifiers related to first devices of at least one of a manufacturer or a distributor.

31. The system of claim 1, wherein the global identifier list is maintained at least partially external to the device by at least one of a manufacturer or a distributor of a device or an accessory.

32. The semiconductor chip of claim 26, wherein the database is maintained at least partially external to the semiconductor chip by a manufacturer or a distributor.

33. The microcontroller of claim 28, wherein the database is maintained at least partially external to the microcontroller by a manufacturer or a distributor.

34. The method of claim 30, wherein the global unique identifier blacklist is maintained at least partially external to the second device by a manufacturer or a distributor of a first device or a second device.

\* \* \* \* \*

UNITED STATES PATENT AND TRADEMARK OFFICE
CERTIFICATE OF CORRECTION

| | | |
|---|---|---|
| PATENT NO. | : 8,621,212 B2 | |
| APPLICATION NO. | : 12/645062 | |
| DATED | : December 31, 2013 | |
| INVENTOR(S) | : Schaecher et al. | |

It is certified that error appears in the above-identified patent and that said Letters Patent is hereby corrected as shown below:

In the Claims:

In Column 9, Line 17, the word "list" is missing after the word "identifier"

Signed and Sealed this
First Day of July, 2014

Michelle K. Lee
*Deputy Director of the United States Patent and Trademark Office*